(12) United States Patent
Mori

(10) Patent No.: US 6,344,963 B1
(45) Date of Patent: Feb. 5, 2002

(54) MULTI LAYER CERAMIC ELECTRONIC PARTS

(75) Inventor: Takeshi Mori, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/536,548

(22) Filed: Mar. 28, 2000

(30) Foreign Application Priority Data

Mar. 29, 1999 (JP) ............................................. 11-085291

(51) Int. Cl.$^7$ ..................... H01G 4/228; H01G 4/008; H01G 4/06
(52) U.S. Cl. ..................... 361/306.3; 361/305; 361/311
(58) Field of Search .................... 361/306.1, 306.2, 361/306.3, 308.1, 308.2, 309, 311, 312, 313, 321.1–321.5, 320

(56) References Cited

U.S. PATENT DOCUMENTS

| | | | | |
|---|---|---|---|---|
| 4,982,485 A | * | 1/1991 | Nakaya et al. | 29/25.42 |
| 5,426,560 A | * | 6/1995 | Amaya et al. | 361/309 |
| 5,822,176 A | * | 10/1998 | Sano et al. | 361/321.4 |
| 5,841,626 A | * | 11/1998 | Sano et al. | 361/321.5 |
| 5,995,360 A | * | 11/1999 | Hata et al. | 361/321.5 |
| 6,002,577 A | * | 12/1999 | Wada et al. | 361/312 |

FOREIGN PATENT DOCUMENTS

| | | |
|---|---|---|
| JP | 6-140278 | 5/1994 |
| JP | 6-204078 | 7/1994 |

* cited by examiner

*Primary Examiner*—Dean A. Reichard
*Assistant Examiner*—Eric Thomas
(74) *Attorney, Agent, or Firm*—Flynn, Thiel, Boutell & Tanis, P.C.

(57) ABSTRACT

A multi-layer ceramic electronic part is made up of: a laminated body in which a ceramic layer and internal electrodes are laminated on one another and external electrodes are provided at end portions of the laminated body. The internal electrodes oppose each other reach to either one of at least a pair of edges of the ceramic layer, thereby leading out the internal electrodes opposing each other to either one of the end surfaces of the laminated body and connecting the internal electrodes led out to the end surfaces of the laminated body to the external electrodes. Each of the external electrodes has a first conductor layer which is closely contacting with only the end surface of the laminated body and a second conductor layer which covers from the first conductor layer to a portion of a side surface adjacent to the end surface of the laminated body. The first conductor layer is larger than the second conductor layer in the content of a common material which is commonly used with ceramic material for forming the ceramic layer. With this multi-layer ceramic electronic part, cracks due to heat-shock can be prevented from occurring within the laminated body and the soldering property of the external electrode can be kept in good condition.

5 Claims, 3 Drawing Sheets

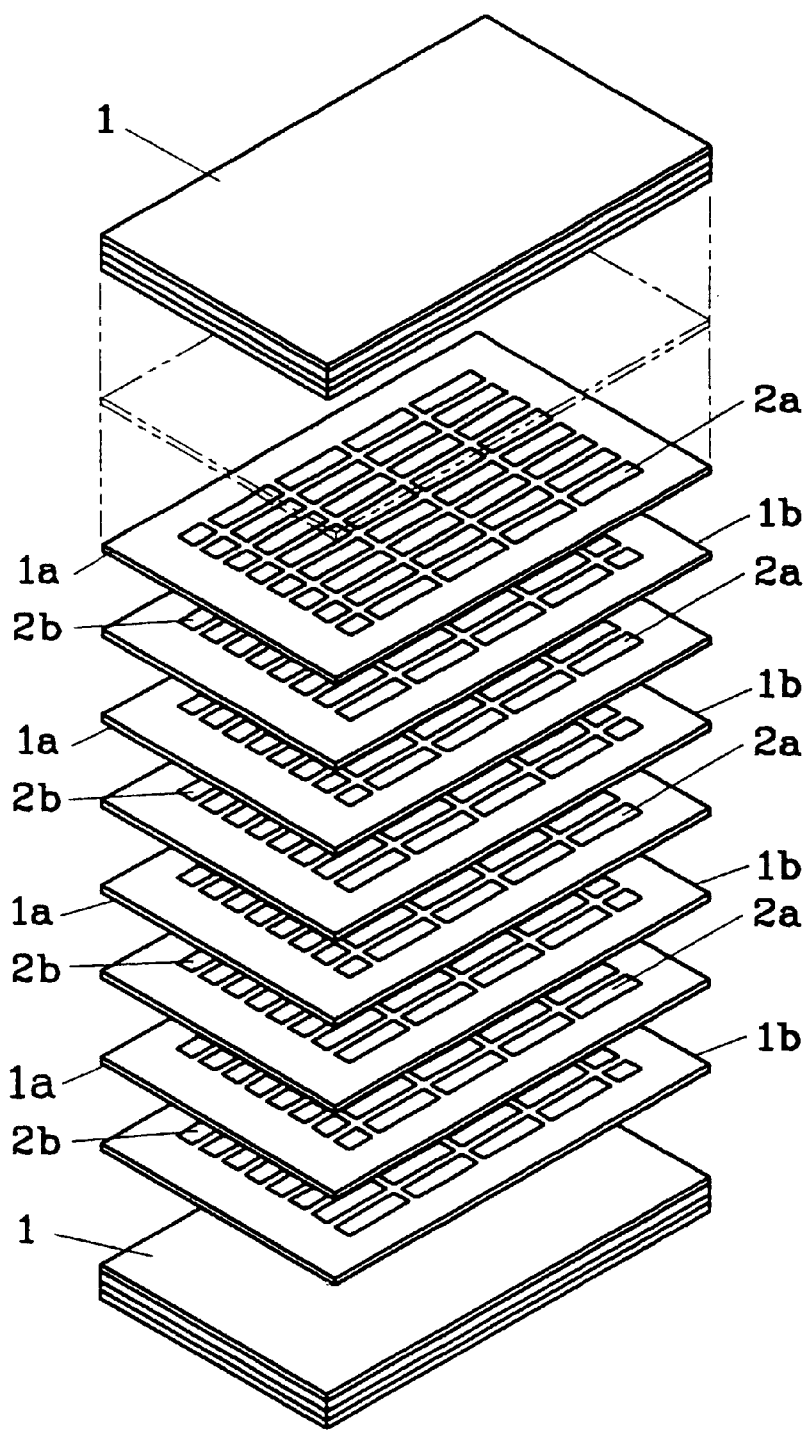

MULTI LAYER CERAMIC ELECTRONIC PARTS

BACKGROUND OF THE INVENTION

1. Field of the Invention

The present invention relates to multi-layer ceramic electronic parts having, for example, a laminated body of internal electrode patterns and ceramic layers therein, at end portions of which are provided external electrodes so as to conduct to the internal electrodes, and in particular to multi-layer ceramic electronic parts in which a material common with the ceramic material for forming the ceramic layers of the laminated body is added into at least a portion of the external electrodes thereof.

2. Description of Related Art

As electronic components of a laminated type can be listed, for example, a laminated capacitor, a laminated inductor, a laminated piezo element, a laminated filter, a ceramic multi-layer circuit board, etc.

For example, in the laminated ceramic capacitor, as being the most representative one of the laminated electronic components, a large number of layers are piled up or laminated, each having an internal electrode and made of dielectric material, wherein the above-mentioned internal electrodes are pulled out one another to the end surfaces of the laminated body opposing to each other. On the end surfaces to which those internal electrodes are pulled out, external electrodes are formed, and those external electrodes are also connected to the above-mentioned internal electrodes, respectively.

The above-mentioned laminated body 3 of the laminated ceramic capacitor has a layer construction as shown in FIG. 3, for example. Namely, the ceramic layers 7,7 . . . , each having the internal electrode 5 or 6 and made of dielectric material, are laminated in an order as shown in FIG. 3, and further, on both sides (i.e., on upper and lower sides) thereof are piled up or laminated the ceramic layers 7,7 . . . in a plurality thereof, on which no such the electrode 5 or 6 is formed, respectively. Upon the end portions of the laminated body 3 having such a layer structure therein, the internal electrodes 5 and 6 expose one another, and as shown in FIG. 1, the above-mentioned external electrodes 2 and 2 are formed at the end portions of this laminated body 3.

Such a laminated ceramic capacitor, ordinarily, is not manufactured one by one, in or as a unit of one part as shown in FIG. 3, but actually is obtained by a manufacturing method which will be described below. Namely, first of all, minute ceramic powder and organic binder are mixed to prepare a slurry, and it is extended thinly on a carrier film made from a polyethylene terephthalate film, etc., by the doctor blade method. Then, it is dried to be formed into a ceramic green sheet. Next, this ceramic green sheet is cut out into a desired size by a cutting head, while being mounted on the supporting sheet, and is printed with a conductive paste on one side surface thereof by a screen printing method, and is dried. With this, the ceramic green sheets 1a and 1b are obtained, on each of which plural sets of the internal electrode patterns 2a and 2b are aligned or arranged in the vertical and horizontal directions, as shown in FIG. 4.

Next, plural pieces of the ceramic green sheets 1a and 1b, each having the above-mentioned internal electrode patterns 2a or 2b thereon, are piled up or laminated, and further are piled several pieces of the ceramic green sheets 1,1 . . . not having the internal electrodes 2a or 2b, at the top and the bottom thereof. They are compressed and put together, thereby forming the laminated body. Here, the above ceramic green sheets 1a and 1b are piled up on one another, on which the internal electrode patterns 2a and 2b are shifted by half a length in a longitudinal direction thereof. After that, the laminated body is cut out into a desired size, thereby manufacturing the laminated raw chips, and those raw chips are baked. In this manner are obtained the laminated bodies as shown in FIG. 3.

Next, this baked laminated body 3 is applied with a conductor paste on both ends thereof and is baked, and on the surface of the baked conductive film is treated a plating, thereby completing the laminated ceramic capacitor formed with the external electrodes at both ends thereof, as shown in FIG. 1.

The multi-layer ceramic electronic parts, such as the laminated ceramic capacitor mentioned above, is mounted on a circuit board and is soldered at the external electrodes 2 and 2 on both ends thereof on land electrodes of the circuit board.

However, such a laminated ceramic capacitor generates thermal stress within the laminated body 3 due to heat-shock when being soldered at the external electrodes thereof or due to a change of a circumference temperature under the condition of use after the soldering. With this thermal stress, in particular in end portions of the external electrodes 2 and 2 of the laminated body 3, cracks can easily occur. The cracks occurring in the laminated body 3 bring about a lowering in insulation due to the invasion of moisture inside and a lowering in static capacitance due to discontinuity of the internal electrodes 5 and 6, thereby causing a low reliability thereof.

Such a thermal stress causing the cracks in the laminated body occurs due to the difference in thermal expansion ratio between the ceramic material, which is a main ingredient for forming the laminated body 3, and the conductor, which is a main ingredient for forming the external electrodes 2 and 2. Then, conventionally, a measure was taken, by adding into the conductor paste for forming the external electrodes 2 and 2 the ceramic material for forming the ceramic layer 7 as a common material, thereby minimizing the difference between the ceramic layer 7 and the external electrodes 2 and 2 in physical properties, such as the thermal stress therein.

However, if a large amount of the common material, i.e., the ceramic material for forming the ceramic layer 7, is put or added into the conductor paste for forming the external electrodes 2 and 2, stickiness or adhesiveness of the external electrodes 2 and 2 onto the external electrodes 5 and 6 comes to be inferior, i.e., the connecting resistance therebetween becomes large and also the electrical properties thereof deteriorate. Further the stickiness or adhesiveness onto the solder or Sn plating also deteriorates. As a result of this, the solder wetability of the external electrodes 2 and 2 becomes inferior, therefore mis-mounting easily occurs when mounting the multi-layer ceramic electronic parts on the circuit board.

SUMMARY OF THE INVENTION

An object, according to the present invention, for solving the problems in the conventional art mentioned above, is to provide a multi-layer ceramic electronic part, wherein the cracks in the laminated body hardly occur due to heat-shock accompanying a change in temperature under the conditions of being soldered and during the use thereafter, and further, the adhesiveness between the external and internal electrodes and the adhesiveness of solder onto the external electrode are superior, as well, thereby also being superior in soldering property with the external electrodes.

According to the present invention, for achieving the above-mentioned object, a first conductor film 21 containing a relatively small amount of a common material with respect to the conductor component is formed only on the end surfaces of the laminated body 3, upon which the edges of the internal electrodes 5 and 6 are led out, and a second conductor film 22 containing no common material or containing a very small amount thereof is provided on this first conductor film 21 to cover a portion of the side surfaces adjacent to the laminated body 3, thereby forming the external electrodes 2 and 2.

Namely, according to the present invention, there is provided a multi-layer ceramic electronic part, comprising:
a laminated body 3 in which a ceramic layer 7 and internal electrodes 5 and 6 are laminated one another; and
external electrodes 2 and 2 are provided at end portions of the laminated body 3, in which the internal electrodes 5 and 6 opposing to each other reach to either one of at least a pair of edges of the ceramic layer 7, thereby leading out the internal electrodes 5 and 6 opposing to each other to either one of end surfaces of the laminated body 3, and connecting the internal electrodes 5 and 6 led out to the end surfaces of the laminated body 3 to the external electrodes 2 and 2, respectively, wherein each of the external electrodes 2 and 2 has a first conductor layer 21 which closely contacts with only the end surface of the laminated body 3 and a second conductor layer 22 which covers from the first conductor layer 21 to a portion of a side surface adjacent to the end surface of the laminated body 3, and the first conductor layer 21 is larger than the second conductor layer 22, in percent content of a common material which is commonly used with the ceramic material for forming the ceramic layer 7.

Here, in the multi-layer ceramic electronic part defined above, the second conductor layer 22 of each of the external electrodes 2 and 2 is higher than the first conductor layer 22 in density of the conductor.

Further, in the multi-layer ceramic electronic part defined above, the first conductor layer 21 and the second conductor layer 22 of each of the external electrodes 2 and 2 are formed as one conductor body by baking them at the same time.

In the multi-layer ceramic electronic part, since the first conductor layer 21 of each of the external electrodes 2 and 2, which are provided on the end surfaces of the laminated body 3, contains a relatively small amount of the common material, the adhesiveness onto the surface of the ceramic layers 7 and the adhesiveness to the internal electrodes 5 and 6 is good or satisfactory at the end surfaces of the laminated body 3. Thereby, the contact resistance between the external electrodes 2 and 2 and the internal electrodes 5 and 6 is small, and the separation or exfoliation of the first conductor layers 21 from the end surfaces of the laminated body 3 hardly occurs.

On the other hand, the second conductor layer 22 of each of the external electrodes 2 and 2, which are soldered onto the land electrodes on the circuit board, since they contain no common material or contain a little bit thereof, the density of the conductor is high therein. Therefore, the adhesiveness onto the solder plating and/or Sn plating is good or satisfactory on the surfaces of the external electrodes 2 and 2. As a result of this, the wetability of the external electrodes 2 and 2 with solder is also good, and the soldering strength is also high when the component is mounted.

Furthermore, the second conductor layer 22 of each of the external electrodes 2 and 2, which turn around on the side surfaces of the laminated body 3 in a portion thereof, is large in conductor density, i.e., is small in the percentage content of the material common to the ceramic material forming the ceramic layers 7, therefore the bonding power is small on the surface of the ceramic layers 7 forming the side surfaces of the laminated body 3. Therefore, shifting occurs easily between the second conductor layers 22 and the side surface portions of the laminated body 3 when the temperature changes, so thermal stresses hardly occur within the laminated body 3. Accordingly, the cracks hardly occur in the laminated body 3.

In the multi-layer ceramic electronic part as defined above, it is preferable that the percentage content of the common material in the first conductor layers 21 of the external electrodes 2 and 2 lies from 3 weight % to 40 weight % with respect to 100 weight % of conductor component. If the percentage content of the common material in the first conductor layers 21 is less than 3 weight % with respect to the 100 weight % of conductor component, the adhesiveness thereof to the ceramic layers 7 becomes bad or unsatisfactory, thereby the first conductor layer 21 can be easily exfoliated or peeled off from the end surface of the laminated body 3. On the other hand, if the percentage content of the common material in the first conductor layers 21 exceeds the 40 weight %, the adhesiveness of the first conductor layers 21 onto the internal electrodes 21 becomes bad, then the contact resistance between the external electrodes 2 and 2 and the internal electrodes 5 and 6 becomes too large.

Though the second conductor layer 21 of the external electrodes 2 and 2 must not contain the common material therein, and even in a case where it contains the common material therein, the percentage content thereof is preferably small, such as being equal to or less than 2 weight % to the 100 weight % of the conductor component. If the percentage content of the common material in the second conductor layers 22 of the external electrodes 2 and 2 exceeds the 2 weight % to the 100 weight % of the conductor component, the adhesiveness thereof onto the ceramic layers 7 becomes too good, then the thermal stress within the laminated body 3 becomes large, when the temperature changes, at the end portions of the external electrodes 2 and 2.

In this manner, in the multi-layer ceramic electronic part according to the present invention, not only does the adhesiveness between the external electrodes 2 and 2 and the internal electrodes 5 and 6 at the end surfaces of the laminated body 3, but also the adhesiveness between the external electrodes 2 and 2 and the ceramic layers 7 becomes satisfactory. Also, the adhesiveness upon the surfaces of the external electrodes 2 and 2 onto the solder and the Sn plating becomes satisfactory. As a result of this, the wetability of the external electrodes 2 and 2 onto the solder becomes superior, and the strength of the soldering becomes high when the component is mounted.

Furthermore, the thermal stress accompanying the change of temperature hardly occurs, and cracks hardly occur within the ceramic layers 7.

BRIEF DESCRIPTION OF DRAWINGS

FIG. 4 is an exploded view for showing a condition of laminating of ceramic green sheets for manufacturing the multi-layer ceramic electronic part.

DESCRIPTION OF THE PREFERRED EMBODIMENTS

Figure 1:
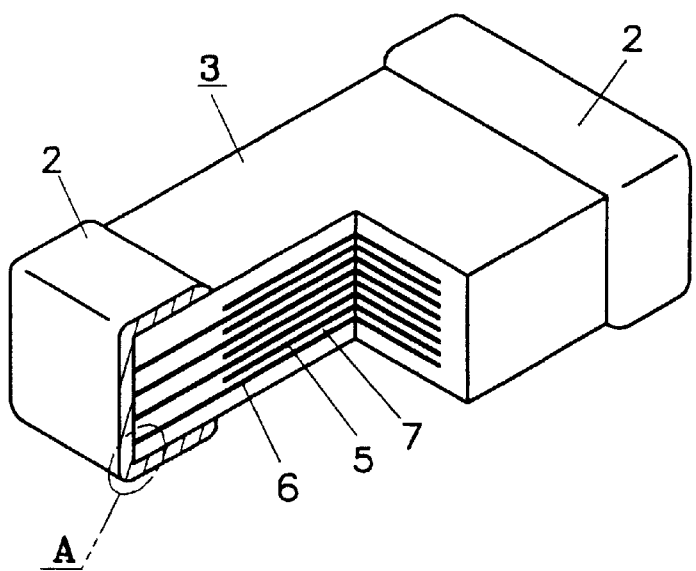
FIG. 1 is a perspective view of a multi-layer ceramic electronic part according to the present invention, a portion of which is cut out.

Hereinafter, detailed and specific explanation of the embodiments according to the present invention will be given by referring to the attached drawings.

Explanation will be given on a laminated ceramic capacitor, as an example of the multi-layer ceramic electronic part, and on a method for manufacture thereof.

First of all, a powder of a dielectric ceramic material, such as barium titanate, for example, is dispersed into an organic binder, such as an acryl or the like, dissolved into a solvent, such as ethanol, etc., to prepare a ceramic slurry. This ceramic slurry is pasted or applied thinly, on a base film made from a polyethylene terephthalate film or the like, with a constant thickness, and is dried, thereby producing a film-like ceramic green sheet. After that, this ceramic green sheet is cut out into an appropriate size.

Next, as shown in FIG. 4, on the cut ceramic green sheets 1a and 1b, two (2) kinds of internal electrode patterns 2a and 2b are printed, respectively, using a conductor paste. For example, the conductor paste is obtained by adding into 100 weight % of one kind of conductor power selected from Ni, Cu, Ag, Pd, Ag—Pd, 3–12 weight % of a binder selected from ethyl cellulose, acryl, polyester, etc., and 80–120 weight % of a solvent selected from butyl carbitol, butyl carbitol acetate, terpineol, ethylcellosolve, a hydrocarbon, etc., and they are mixed and dispersed equally, to be applied.

The ceramic green sheets 1a and 1b, on which the internal electrode patterns 2a and 2b are printed, are stacked on one another, as shown in FIG. 4, and on both sides (i.e., an upper side and a lower side) thereof are further stacked ceramic green sheets 1 and 1, on which no internal electrode pattern 2a or 2b is printed, i.e., dummy sheets, and then they are pressed to obtain the laminated body. Further, this laminated body is cut in vertical and horizontal directions and separated into chip-like laminated bodies. After that, through baking of those laminated bodies, the baked laminated bodies 3, having the layer structure as shown in FIG. 3, can be obtained.

Figure 3:
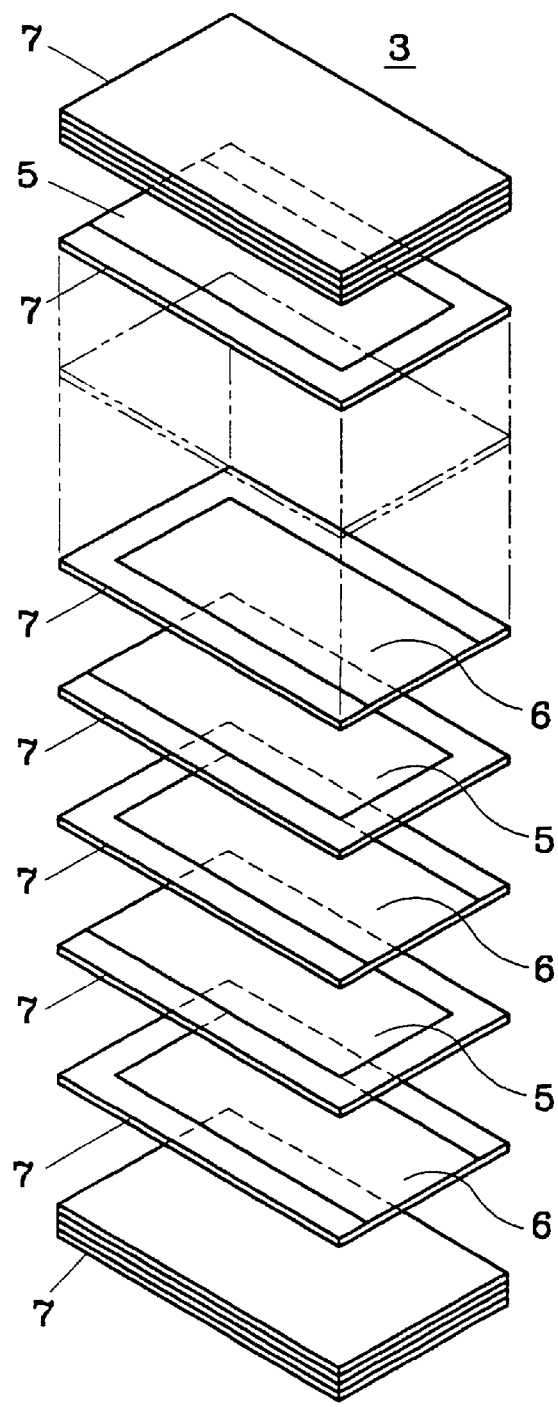
FIG. 3 is an exploded view showing the layers of a laminated body, in an example of the above multi-layer ceramic electronic parts.

As shown in FIG. 3, the ceramic layers 7,7 . . . , each made of a dielectric material and having the internal electrode 5 or 6 thereon, are laminated in the laminated body 3, and on both sides thereof are stacked a plurality of the ceramic layers 7,7 . . . , on which no internal electrode 5 or 6 is formed. In the laminated body 3, the internal electrodes 5 and 6, opposing each other through the ceramic layer 7, are led out to both end surfaces of the laminated body 3, alternatively.

As shown in FIG. 1, on both ends of the laminated body 3, where the respective internal electrodes 5 and 6 are led out, the conductor paste is applied and baked thereon, thereby forming the external electrodes 2 and 2.

Here, a first conductor paste and a second conductor paste are prepared, i.e., the former, by adding into 100 weight % of Ni powder, 3–12 weight % of ethyl cellulose as the binder, 80–120 weight % of the solvent, and 3–40 weight % of barium titanate as a so-called common material, while the latter, by adding into 100 weight % of Ni powder, 3–12 weight % of ethyl cellulose as the binder, 80–120 weight % of the solvent, and 0–2 weight % of barium titanate as the so-called common material.

Then, first of all, the first conductor paste is applied on only both end surfaces of the laminated body 3, where the internal electrodes 5 and 6 are led out, and is dried. Thereafter, the second conductor paste is applied, on the first conductor paste which is dried and also covering over a portion of the side surfaces of the laminated body 4 continuously to the end surfaces thereof, and is dried. Those applied conductor pastes are baked at a temperature of about 1,200° C.

Further, upon the conductor films formed by the baking are applied a solder plating, so as to form the external electrodes 2 and 2 therewith. Thereby, the multi-layer ceramic electronic part is completed.

Figure 2:
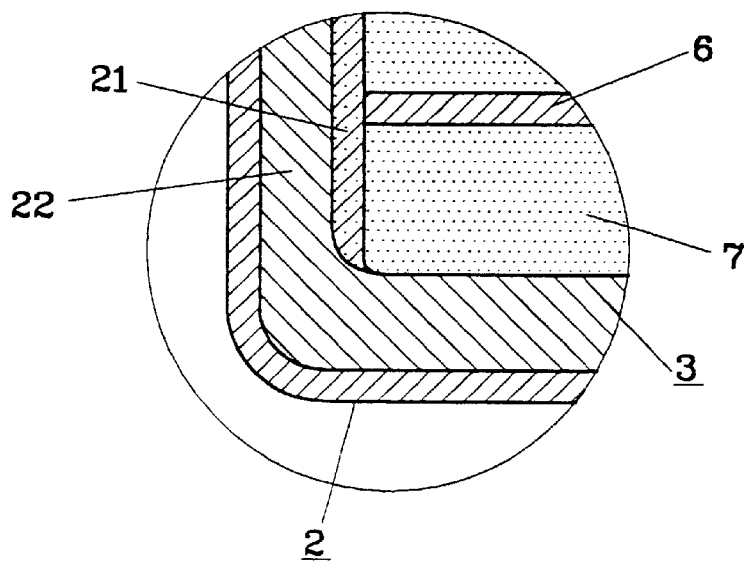
FIG. 2 is an enlarged cross-section view of a principle portion, in particular, showing a portion A in the FIG. 1 of the above multi-layer ceramic electronic part.

FIG. 2 shows the cross-section of the external electrode 2 which is formed in this manner, in diagrammatic illustration, and is an enlarged cross-section view of a portion corresponding to the portion A in the FIG. 1. A reference numeral 24 indicates a plating layer at the outermost of the external electrode 2.

As is shown in FIG. 2, the external electrode 2 is formed as a single body conductor layer, by baking the paint layers of the first and second conductor pastes. The first conductor layer 21 is formed only upon the end surfaces of the laminated body 3, where the internal electrodes 5 and 6 are led out. The second conductor layer 22 is formed to cover the first conductor layer 21 and also over the portion of the side surfaces of the laminated body 3 adjacent thereto.

Also, the first conductor layer 21 and the second conductor layer 22 of the external electrode 2 are different in the content percentage of the common material and therefore are also different in the density of the conductor contained therein. Namely, the first conductor layer 21 of the external electrode 2 is larger than the second conductor layer 22 in the percentage content of the common material and therefore is smaller in the density of the conductor therein. In more detail, in the first conductor layer 21 of the external electrode 2, 3–40 weight % of the barium titanate is contained to 100 weight % of Ni powder as the so-called common material, while only 0–2 weight % of the barium titanate is contained to 100 weight % of Ni powder as the so-called common material.

Next, explanation will be given on a specific example and a comparison thereto.

Example

Powder of a dielectric ceramic material, such as barium titanate, for example, is dispersed into an organic binder, such as acryl or the like, being dissolved into a solvent, thereby to prepare ceramic slurry. This ceramic slurry is pasted or applied thinly on a base film made from a polyethylene terephthalate film or the like, with a constant thickness of 10 μm, and is dried, thereby producing a film-like ceramic green sheet. After that, this ceramic green sheet is separated from the base film, and is cut out into a plurality of ceramic green sheets of 150 mm×150 mm.

On the other hand, into the powder of 100 weight % of Ni powder are added a binder of 8 weight % of ethyl cellulose, a solvent of 100 weight %, and a barium titanate powder of 15 weight % as the so-called common material, and they are mixed and dispersed equally, thereby preparing the conductor paste. With the use of this Ni paste, the internal electrodes 1a and 1b as shown in the FIG. 4 are formed on the ceramic green sheets, respectively, by means of a screen printing apparatus or component.

The ceramic green sheets 2a and 2b, on which the internal electrode patterns 1a and 1b are printed, are stacked on one another, in a predetermined number of pieces thereof, and on the upper and the lower sides thereof are further stacked the ceramic green sheets, on which no internal electrode pattern is printed, i.e., the dummy sheets, and then they are pressed in the laminating direction by a pressure of 200 t, under a temperature of 120° C, for bonding them together, thereby obtaining the laminated body.

This laminated body is cut out into a size 5.3 mm×5.0 mm, and those laminated bodies are baked at a temperature of 1,320° C., thereby obtaining the baked laminated bodies 3 as shown in FIG. 3.

The first conductor paste and the second conductor paste are prepared, i.e., the former, by adding into 100 weight % of Ni powder, 3–12 weight % of ethyl cellulose as the binder, 80–120 weight % of the solvent, and 30 weight % of barium titanate as the so-called common material, while the latter, by adding into 100 weight % of Ni powder, 3–12 weight % of ethyl cellulose as the binder, and 80–120 weight % of the solvent, but without addition of the barium titanate as the so-called common material.

First of all, the first conductor paste is applied on only both end surfaces of the laminated body 3, where the internal electrodes 5 and 6 are led out, and is dried. Thereafter, the second conductor paste is applied, covering on the first conductor paste which is dried and also covering over a portion of the side surfaces of the laminated body 4, being continuous to the end surfaces thereof, and is dried. The applied conductor pastes are then baked at a temperature of about 1,200° C.

Thereafter, the chips are put into an electrolysis barrel plating container, to apply a Si plating film on the Ni film. Thereby, the external electrodes 2 and 2 are formed, and the laminated ceramic capacitor as shown in FIG. 1 is manufactured. This laminated ceramic capacitor is indicated as Example 1 in a Table 1.

Picking up at random a hundred (100) pieces from the laminated ceramic capacitors of Example 1, those hundred (100) pieces of the laminated ceramic capacitors are mounted on a circuit board, with soldering of the external electrodes thereof on the land electrodes of the circuit board. After that, those laminated ceramic capacitors are taken out from the circuit board to be buried into a resin of an acryl group, and each laminated ceramic capacitor is cut or ground under the condition of being held firmly therein, in a direction orthogonal to the laminating direction of the internal electrodes 5 and 6.

Observing the presence of cracks inside the laminated body 3 upon the cross-section being exposed by the grinding, among the hundred (100) pieces of the laminated ceramic capacitors in total, none of them had a crack inside the laminated body 3 thereof, and the number 0 is indicated in the Table 1.

Also, the condition of adhesion between the external electrode 2 and the internal electrode 5 or 6 of those hundred (100) pieces of the laminated ceramic capacitors, was observed by means of an optical microscope. As a result of this observation, the adhesion condition between the external electrode 2 and the internal electrode 5 or 6 was good in any one of the hundred (100) pieces of the laminated ceramic capacitors, and this is indicated by 0 in Table 1.

In the same manner to this example, the first and second NI pastes indicated as Examples 2 to 4 in Table 1, are prepared, respectively, so as to manufacture laminated ceramic capacitors formed with the external electrodes 2 therefrom.

Picking up at random a hundred (100) pieces from the laminated ceramic capacitors manufactured, those hundred (100) pieces of the laminated ceramic capacitors are taken out from the circuit board after being mounted thereon, in the same manner as in Example 1.

And, those laminated ceramic capacitors are observed on the presence of cracks inside the laminated body 3 thereof, in the same manner in Example 1. As a result of this, among the hundred (100) pieces of the laminated ceramic capacitors in total, none of them had cracks inside the laminated body 3 thereof, and the number 0 is indicated in Table 1.

Also, the condition of adhesion between the external electrode 2 and the internal electrode 5 or 6 of those hundred (100) pieces of the laminated ceramic capacitors, was observed by means of an optical microscope. As a result of this observation, the adhesion condition between the external electrode 2 and the internal electrode 5 or 6 was also good in any one of the hundred (100) pieces of the laminated ceramic capacitors, and this is indicated by 0 in Table 1.

Comparison

The multi-layer ceramic electronic parts are manufactured in the same manner as mentioned above, but except that the external electrodes 2 are formed by changing the composition of the common material in the first and second conductor pastes as indicated in Table 1, in Example 1. Those are indicated in the Table as Comparisons 1 to 3.

Picking up at random a hundred (100) pieces from each one of the laminated ceramic capacitors manufactured, those hundred (100) pieces of the laminated ceramic capacitors are taken out from the circuit board after being mounted thereon, in the same manner as in Example 1.

Those laminated ceramic capacitors were observed for the presence of cracks inside the laminated body 3 in the same manner as in Example 1. As a result of this, among the hundred (100) pieces of the laminated ceramic capacitors in total, the number of the laminated capacitors in which the cracks were found in the laminated bodies 3 thereof is indicated also in Table 1.

Also, the condition of adhesion between the external electrode 2 and the internal electrode 5 or 6 of those hundred (100) pieces of the laminated ceramic capacitors, was observed by means of an optical microscope. As a result of this observation, a good adhesion condition between the external electrode 2 and the internal electrode 5 or 6 is indicated by 0 in Table 1, but poor adhesion is indicated by x therein.

TABLE 1

| | Percentage Content of Common Material In Conductor Paste | | | Adhersiveness Between External And | Adhesiveness Between Raw Body And |
|---|---|---|---|---|---|
| | First (wt %) | Second (wt %) | Number Of Cracks Generated | Internal Electrodes | Internal Electrode |
| Example 1 | 30 | 0 | 0 | o | o |
| Example 2 | 30 | 2 | 0 | o | o |
| Example 3 | 3 | 0 | 0 | o | o |
| Example 4 | 40 | 0 | 0 | o | o |
| Comparison 1 | 2 | 0 | 0 | o | x |

TABLE 1-continued

|  | Percentage Content of Common Material In Conductor Paste | | Number Of Cracks Generated | Adhersiveness Between External And Internal Electrodes | Adhesivenes Between Raw Body And Internal Electrode |
| --- | --- | --- | --- | --- | --- |
|  | First (wt %) | Second (wt %) | | | |
| Comparison 2 | 45 | 0 | 0 | x | ○ |
| Comparison 3 | 30 | 3 | 8 | ○ | ○ |

Though the explanation was given mainly on the laminated ceramic capacitor as one example of the multi-layer ceramic electronic parts in the embodiment mentioned above, the present invention relating to the multi-layer ceramic electronic parts can be also applied to, for example, a laminated ceramic inductor, a laminated ceramic LC composite part, a ceramic multi-layer wiring print board, etc.

What is claimed is:

1. A multi-layer ceramic electronic part comprising:
   a laminated body comprising a ceramic layer having internal electrodes laminated thereon, wherein adjacent internal electrodes extend to opposite edge surfaces of the laminated body; and
   external electrodes provided at end portions of the laminated body and connected with said internal electrodes at the edge surfaces of the laminated body, each of the external electrodes comprising a first conductor layer which is provided only on the edge surfaces of the laminated body and a second conductor layer covering the first conductor layer and a portion of side surfaces of the laminated body adjacent to said end portions, the first conductor layer having a larger content of common material with the ceramic layer than the second conductor layer and being more strongly adhered to the laminated body than the second conductor layer.

2. The multi-layer ceramic electronic part of claim 1, wherein the second conductor layer has a higher content of conductive material than the first conductor layer.

3. The multi-layer ceramic electronic part of claim 1, wherein the content of said common material in the first conductor layer is from 3–40 weight % per 100 weight % of conductive material.

4. The multi-layer ceramic electronic part of claim 1, wherein the content of said common material in the second conductor layer is from 0–2 weight % per 100 weight % of conductive material.

5. The multi-layer ceramic electronic part of claim 1, wherein the first and second conductor layers are formed as one conductor body by baking them at the same time.

\* \* \* \* \*